United States Patent
Jones et al.

(10) Patent No.: US 11,461,788 B2
(45) Date of Patent: Oct. 4, 2022

(54) MATCHING A CUSTOMER AND CUSTOMER REPRESENTATIVE DYNAMICALLY BASED ON A CUSTOMER REPRESENTATIVE'S PAST PERFORMANCE

(71) Applicant: INTERNATIONAL BUSINESS MACHINES CORPORATION, Armonk, NY (US)

(72) Inventors: Steven Ware Jones, Astoria, NY (US); Arjun Jauhari, Jersey City, NJ (US); Jennifer A. Mallette, Vienna, VA (US); Vivek Salve, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 16/452,889

(22) Filed: Jun. 26, 2019

(65) Prior Publication Data
US 2020/0410506 A1    Dec. 31, 2020

(51) Int. Cl.
*G06Q 30/00* (2012.01)
*G06N 20/00* (2019.01)
*G06Q 10/06* (2012.01)

(52) U.S. Cl.
CPC .......... *G06Q 30/016* (2013.01); *G06N 20/00* (2019.01); *G06Q 10/063112* (2013.01)

(58) Field of Classification Search
CPC ......... G06Q 30/016; G06Q 10/063112; G06N 20/00
USPC ....................................................... 705/7.14
See application file for complete search history.

(56) References Cited

U.S. PATENT DOCUMENTS

| | | |
|---|---|---|
| 6,189,002 B1 | 2/2001 | Roitblat |
| 6,266,319 B1 | 7/2001 | Ikebe |
| 6,766,316 B2 | 7/2004 | Caudill |
| 7,184,540 B2 | 2/2007 | Dezonno |
| 8,266,098 B2 | 9/2012 | Hu |
| 9,020,137 B2 | 4/2015 | Chishti |
| 9,077,804 B2 | 7/2015 | Kannan |

(Continued)

OTHER PUBLICATIONS

Tomaž Erjavec "Machine Learning of Morphosyntactic Structure: Lemmatizing Unknown Slovene Words" Applied Artificial Intelligence, ISSN: 0883-9514 (Print) 1087-6545 (Online) Journal homepage: https://www.tandfonline.com/loi/uaai20, 2004 (Year: 2004).*

(Continued)

*Primary Examiner* — Abdallah A El-Hage Hassan
(74) *Attorney, Agent, or Firm* — Alexis N. Hatzis

(57) ABSTRACT

A method, computer system, and a computer program product for customer representative matching is provided. The present invention may include receiving a chat transcript with one or more tagged triplets and one or more multi-dimensional success vectors. The present invention may include aggregating the one or more multi-dimensional success vectors. The present invention may include receiving at least one business priority. The present invention may include training a machine learning model to match a customer to at least one customer representative. The present invention may include querying the trained machine learning model to match the customer to the at least one customer representative. The present invention may include revealing a match.

18 Claims, 7 Drawing Sheets

(56) References Cited

U.S. PATENT DOCUMENTS

| | | | |
|---|---|---|---|
| 9,813,556 | B2 | 11/2017 | Sharpe |
| 2010/0054452 | A1 | 3/2010 | Afzal |
| 2010/0111287 | A1 | 5/2010 | Qiaobing |
| 2011/0307257 | A1 | 12/2011 | Pereg |
| 2012/0005113 | A1 | 1/2012 | Kotis |
| 2012/0076283 | A1 | 3/2012 | Ajmera |
| 2012/0130771 | A1 | 5/2012 | Kannan |
| 2012/0185544 | A1 | 7/2012 | Chang |
| 2012/0310627 | A1* | 12/2012 | Qi ........................... G06F 40/30 704/9 |
| 2014/0025376 | A1* | 1/2014 | Wasserblat ............. G10L 25/51 704/238 |
| 2015/0195406 | A1* | 7/2015 | Dwyer .................. G06F 40/279 379/265.07 |
| 2015/0215463 | A1* | 7/2015 | Shaffer ............... H04M 3/5232 379/265.1 |
| 2015/0269142 | A1 | 9/2015 | Antebi |
| 2015/0317383 | A1 | 11/2015 | Alkov |
| 2015/0358207 | A1* | 12/2015 | Baldock ............. G06Q 30/0201 709/224 |
| 2017/0149976 | A1* | 5/2017 | Conway ............. H04M 3/5183 |
| 2017/0300499 | A1* | 10/2017 | Lev-Tov ................. G06F 16/34 |
| 2018/0053119 | A1 | 2/2018 | Zeng |
| 2018/0091654 | A1* | 3/2018 | Miller ................ G06Q 50/2057 |
| 2018/0096617 | A1 | 4/2018 | Tapuhi |
| 2018/0101799 | A1* | 4/2018 | Ray .................. G06Q 10/06311 |
| 2018/0131811 | A1 | 5/2018 | Buehler |
| 2018/0137854 | A1 | 5/2018 | Perez |
| 2018/0191905 | A1 | 7/2018 | McCoy |
| 2018/0205828 | A1 | 7/2018 | Conway |
| 2018/0278750 | A1* | 9/2018 | Avila ...................... H04L 51/02 |
| 2019/0043483 | A1 | 2/2019 | Chakraborty |
| 2019/0180291 | A1* | 6/2019 | Schmeling ............. B33Y 80/00 |
| 2019/0370714 | A1* | 12/2019 | Liubyvyi ........... G06Q 10/0633 |
| 2020/0126533 | A1 | 4/2020 | Doyle |
| 2020/0178876 | A1* | 6/2020 | Lam ....................... G16H 50/30 |
| 2020/0311204 | A1* | 10/2020 | Gupta ...................... G06N 5/04 |
| 2020/0410505 | A1 | 12/2020 | Jones |
| 2020/0412868 | A1 | 12/2020 | Jones |

OTHER PUBLICATIONS

Shoetsu Sato, "Modeling Situations in Neural Chat Bots" Proceedings of the 55th Annual Meeting of the Association for Computational Linguistics—Student Research Workshop, pp. 120-127 Vancouver, Canada, Jul. 30-Aug. 4, 2017. c 2017 Association for Computational Linguistics, 2017 (Year: 2017).*

Kevin Malinak, TF-IDF Chat User Clustering Malinak1@stanford.edu, swensonj@stanford.edu SUID: 05720218, 05713257 Dec. 14, 2013 (Year: 2013).*

Kannan, et al., "Smart Reply: Automated Response Suggestion for Email", KDD '16 Proceedings of the 22nd ACM SIGKDD International Conference of Knowledge and Data Mining, Aug. 13-17, 2016 [accessed on Jun. 25, 2019], pp. 955-964, San Francisco, CA, USA, ISBN: 978-1-4503-4232-2, Retrieved from the Internet: <URL: https://arxiv.org/pdf/1606.04870.pdf>.

Kim, "Online Call Quality Monitoring for Automating Agent-Based Call Centers", Interspeech, Aug. 27-31, 2007, pp. 130-133, Antwerp, BE, Retrieved from the Internet: <URL: https://pdfs.semanticscholar.org/4890/e2eff316abd63dc8b70d9969de1596d89650.pdf>.

Mell et al., "The NIST Definition of Cloud Computing", National Institute of Standards and Technology, Special Publication 800-145, Sep. 2011, pp. 1-7.

Park, et al., "Towards Real-Time Measurement of Customer Satisfaction Using Automatically Generated Call Transcripts", ACM Digital Library, Nov. 2-6, 2009, pp. 1387-1396, Hong Kong, CN, Retrieved from the Internet: <URL: https://dl.acm.org/citation.cfm?doid=1645953.1646128>.

IBM: List of IBM Patents or Patent Applications Treated as Related (Appendix P), Aug. 7, 2019, 2 pages.

U.S. Pending U.S. Appl. No. 16/452,819, entitled "Measuring the Effectiveness of Individual Customer Representative Responses in Historical Chat Transcripts", filed Jun. 26, 2019, 47 Pages.

U.S. Pending U.S. Appl. No. 16/452,856, entitled "Rating Customer Representatives Based on Past Chat Transcripts ", filed Jun. 26, 2019, 46 Pages.

Britz, "Deep Learning for Chatbots, Part 1—Introduction", WildML Artificial Intelligence, Deep Learning, and NLP, Apr. 6, 2016 [accessed on Jun. 25, 2019], 4 pages, Retrieved from the Internet: <URL: http://www.wildml.com/2016/04/deep-learning-for-chatbots-part-1-introduction/.

Britz, "Deep Learning for Chatbots, Part 2—Implementing a Retrieval-Based Model in Tensorflow", WildML Artificial Intelligence, Deep Learning, and NLP, Jul. 4, 2016 [accessed on Jun. 25, 2019], 12 pages, Retrieved from the Internet: <URL: http://www.wildml.com/2016/07/deep-learning-for-chatbots-2-retrieval-based-model-tensorflow/>.

* cited by examiner

MATCHING A CUSTOMER AND CUSTOMER REPRESENTATIVE DYNAMICALLY BASED ON A CUSTOMER REPRESENTATIVE'S PAST PERFORMANCE

BACKGROUND

The present invention relates generally to the field of computing, and more particularly to natural language systems.

A customer representative responding to questions received on a live chat interface may be educated on only a portion of the questions that the customer representative may receive. The questions received by the customer representative may vary substantially, encompassing a wide variety of topics, and each question may require a specific skill set to resolve. As a result, the customer representative may spend time searching for an appropriate answer to a customer's question, and/or may not be able to effectively assist the customer in resolving his/her issue.

The customer representative may alternatively and/or additionally transfer the customer to a second customer representative whose skill set encompasses the skill(s) required to effectively assist the customer in resolving his/her issue. This may require additional time by the customer to remain on the chat interface until the customer's issue is effectively resolved.

Furthermore, determining which customer representative has the skill(s) required to effectively assist the customer in resolving his/her issue may depend on current business priorities.

SUMMARY

Embodiments of the present invention disclose a method, computer system, and a computer program product for customer representative matching. The present invention may include receiving a chat transcript with one or more tagged triplets and one or more multi-dimensional success vectors. The present invention may include aggregating the one or more multi-dimensional success vectors. The present invention may include receiving at least one business priority. The present invention may include training a machine learning model to match a customer to at least one customer representative. The present invention may include querying the trained machine learning model to match the customer to the at least one customer representative. The present invention may include revealing a match.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
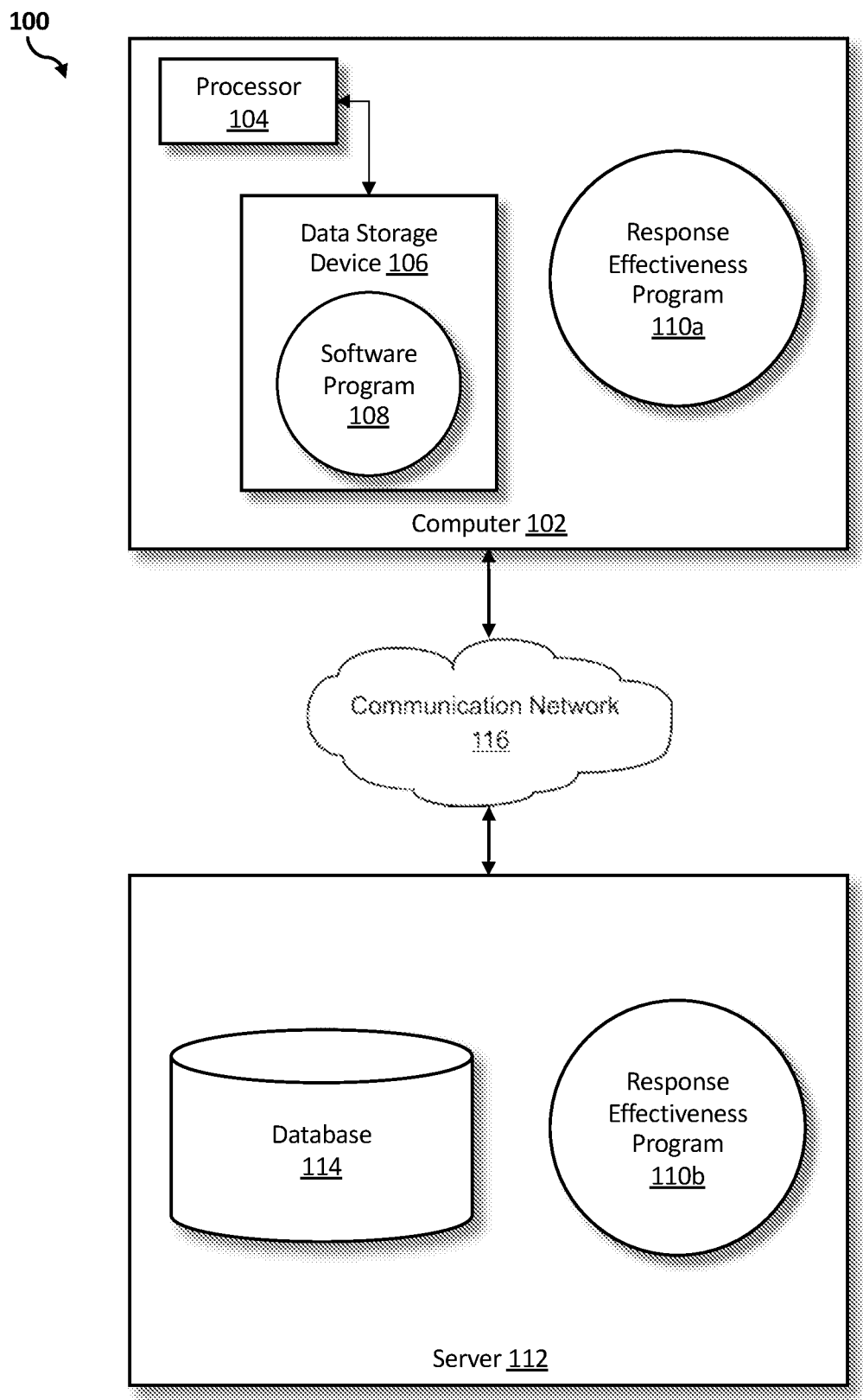
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for response effectiveness. As such, the present embodiment has the capacity to improve the technical field of natural language systems by learning the statements that are most helpful from customer representatives, based on past customer questions, and by suggesting that future customer representatives provide the same answers when faced with similar questions. More specifically, the present invention may include receiving a chat transcript. The present invention may include separating the chat transcript into a set of triplets, the set including two or more triplets. The present invention may include tagging each triplet in the set of triplets with one or more tags, wherein the one or more tags includes an intent, an entity, and a sentiment. The present invention may include generating at least one multi-dimensional success vector. The present invention may include aggregating the generated multi-dimensional success vectors to determine an overall satisfaction.

The present invention may alternatively, or additionally, include receiving a chat transcript with one or more tagged triplets and one or more multi-dimensional success vectors. The present invention may include aggregating the one or more multi-dimensional success vectors. The present invention may include receiving at least one business priority. The present invention may include applying at least one filter to the one or more multi-dimensional success vectors. The present invention may include normalizing the one or more multi-dimensional success vectors based on the at least one applied filter. The present invention may include obtaining a rating.

The present invention may alternatively, or additionally, include receiving a chat transcript with one or more tagged triplets and one or more multi-dimensional success vectors. The present invention may include aggregating the one or more multi-dimensional success vectors. The present invention may include receiving at least one business priority. The present invention may include training a machine learning model to match a customer to at least one customer representative. The present invention may include querying the trained machine learning model to match the customer to the at least one customer representative. The present invention may include revealing a match.

As described previously, a customer representative responding to questions received on a live chat interface may be educated on only a portion of the questions that the customer representative may receive. The questions received by the customer representative may vary substantially, encompassing a wide variety of topics, and each question may require a specific skill set to resolve. As a result, the customer representative may spend time searching for an appropriate answer to a customer's question and/or may not be able to effectively assist the customer in resolving his/her issue.

The customer representative may alternatively and/or additionally match and transfer the customer to a second customer representative whose skill set encompasses the skill(s) required to effectively assist the customer in resolving his/her issue. This may require additional time by the customer to remain on the chat interface until the customer's issue is effectively resolved.

Therefore, it may be advantageous to, among other things, rate in multiple dimensions (i.e., customer intents, business priorities) how helpful a customer representative's responses were to individual customer questions, score a customer representative across an ever-evolving set of business priorities, and match customers to the most qualified customer representative, given the customer representative's response to similar questions in the past.

According to at least one embodiment, the present invention may improve the effectiveness of customer representatives by analyzing and aggregating historical chat transcript data and by determining a customer's satisfaction to responses provided by a customer representative. Historical chat transcript data may be useful in identifying helpful responses provided by a customer representative and may assist a customer representative who does not encompass the skill(s) required to effectively assist the customer in resolving his/her issue in generating a satisfactory response.

Historical chat transcript data may be analyzed and leveraged in order to generate and suggest a response to a customer representative who may be faced with a similar question as was included in the historical chat transcript data, in order to improve the effectiveness of automated customer representative tools.

According to at least one embodiment, the present invention may rate, in multiple dimensions, how helpful a customer representative's response was to an individual customer question. A rating of a customer representative may be based on a received chat transcript, tagged question/answer/question triplets, and a generated success vector, among other things.

According to at least one embodiment, the present invention may evaluate the responses of customer representatives and a customer's satisfaction with the customer representative's response. A trained machine learning model (i.e., a success model) may take as input historical chat transcript data. The success model may be semi-supervised and may not include labeling of the historical chat transcript data. The success model may only require an intent and entity classifier to be trained on the historical chat transcript data, as well as on chat metadata which may include a chat outcome. An intent and entity classifier may include pre-assumed tags which may be leveraged in the overall algorithm. Using the evaluated satisfaction of a customer based on a follow up question of a customer, tags for the customer's follow up question may be created automatically. In certain instances, the intent and entity classifier may need to be retrained in order to recalculate a success vector.

According to at least one embodiment, the present invention may utilize historical chat transcript data to analyze both a customer's needs and a customer representative's skills. The historical chat transcript data may be aggregated and scored across one or more pre-defined categories, and a customer's responses to a customer representative may be used to measure a quality of the customer representative's response. A customer's needs may be analyzed utilizing intents and entities, as well as customer profile information including but not limited to job role.

According to at least one embodiment of the present invention, the success model may be used to depict which customer representative has had the most success across orthogonal categories including but not limited to intent of a customer, entities, and/or customer profile categories. The success model may include generating a multi-dimensional success vector for every response a customer representative gives to a customer's question. To create the success model, the customer's question may be tagged based on orthogonal categories such as intent of a customer (e.g., tagging a pretrained classifier with intents such as pricing, buy, trial, support, infrastructure, and/or analytics, etc.), entities (e.g., product XYZ, version V, etc.), and/or customer profile categories (e.g., decision maker, manager, developer, data scientist, etc.).

For example, orthogonal categories may include which customer representative is the best at answering pricing questions for product XYZ; which customer representative is the most adept at getting users to sign up for trials; which customer representative has the most success dealing with data scientists; and/or which customer representative is the most effective, or has the most knowledge, given the product that is being inquired about.

According to at least one embodiment of the present invention, the success model, described above, may be leveraged to determine which customer representative has the greatest probability of successfully responding to a new question, based on self-learning from historical chat transcript data. Here, the generated multi-dimensional success vectors may be applied to a tool designed to suggest responses to customer representatives while the customer representative chats with a customer, filter out poorly performing customer representative responses, and/or create an overall rank of customer representative responses. The generated multi-dimensional success vectors may also be aggregated to evaluate a customer representative's ability to respond to a particular question.

According to at least one embodiment of the present invention, the success model, described above, may also be leveraged for use with a second machine learning model (i.e., a matching model) to match a customer to a customer representative based on the customer representative's performance in responding to one or more previous questions. The matching model may be used to match a customer to a customer representative based historical chat transcript data which depicts which customer representative is best at responding to a particular question.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a response effectiveness program 110*a*. The networked computer environment 100 may also include a server 112 that is enabled to run a response effectiveness program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the response effectiveness program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the response effectiveness program 110a, 110b (respectively) to automatically rate, in multiple dimensions, how helpful customer representative responses were to individual customer questions. The response effectiveness method of the response effectiveness program 110a, 110b is explained in more detail below with respect to FIGS. 2 through 4.

Figure 2:
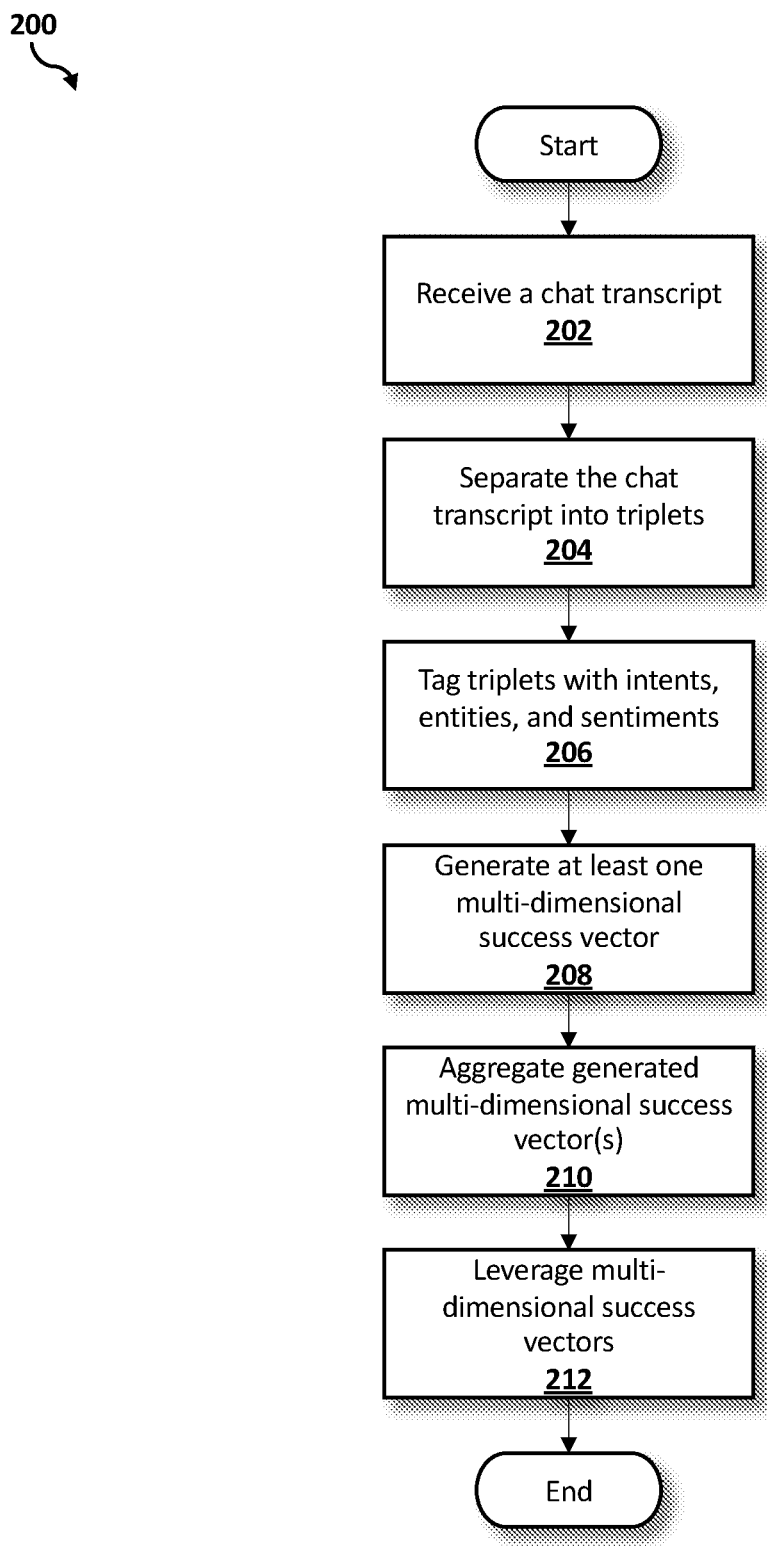
FIG. 2 is an operational flowchart illustrating a process for response effectiveness according to at least one embodiment.

Referring now to FIG. 2, an operational flowchart illustrating the exemplary response effectiveness process 200 used by the response effectiveness program 110a and 110b according to at least one embodiment is depicted.

At 202, a chat transcript is received. A chat transcript may depict a conversation between a customer and a customer representative which includes question and answer pairs (e.g., a customer question followed by a customer representative response), and/or question/answer/question triplets (e.g., a customer question followed by a customer representative response followed by a next customer question or comment).

The received chat transcript may depict one or more questions asked by a customer which are then answered by a customer representative. The response effectiveness program 110a, 110b may utilize a trained machine learning model (i.e., a success model), as will be described in more detail below with respect to steps 204 through 210, to measure the effectiveness of the customer representative's response. The success model may use historical chat transcript data, which may include responses provided by customer representatives to a wide variety of customer questions, to generate one or more success vectors of a customer representative, which may highlight the customer's satisfaction with the customer representative's answers. The historical chat transcript data may include a sizeable amount of past chat transcripts which may be used to train the success model (e.g., past chat transcripts may be stored in a database such as database 114).

The trained machine learning model (i.e., the success model) used by the response effectiveness program 110a, 110b may be semi-supervised and may not include labeling of the historical chat transcript data. A semi-supervised machine learning model may make use of unlabeled data for training purposes. A semi-supervised machine learning model may include using a small amount of labeled data as well as a large amount of unlabeled data to perform a machine learning analysis.

The trained machine learning model (i.e., the success model) used in the present invention may only require an intent and entity classifier to be trained on the historical chat transcript data, as well as on chat metadata which may include a chat outcome. As related to chatbots, an intent may be a customer's intention or desired outcome, and an entity may modify an intent, including representing a subject and/or direct object of the intent.

An intent and entity classifier may include pre-assumed (i.e., pre-defined) tags which may be leveraged in the overall algorithm. Using the evaluated satisfaction of a customer based on a customer's follow-up question, tags for the customer's follow-up question may be created automatically. The intent and entity classifier may need to be retrained in the future in order to recalculate a success vector (e.g., in instances where a customer indicates, using an interactive button, that the customer representative's response was not satisfactory, and the success vector algorithm needs to be modified to reflect the customer's input).

At 204, the received chat transcript is separated into triplets. A received chat transcript may be separated into question/answer/question triplets (i.e., $Q_1AQ_2$) by extracting a question and answer pair (i.e., where the question represents a question or a comment), as well as the customer's question following each answer (i.e., a customer representative's response). Extracting a question and answer pair may be done by searching for a question mark at the end a line and extracting that line as well as the one that follows. Extracting a customer's question following each answer may include searching for the next question mark and extracting that line, and/or extracting the line directly following the customer representative's response to a previous question.

However, question and answer pairs may not include question marks at the end of a line. In these instances, the chat transcript may be separated into triplets by identifying any three assertions made by a customer, a customer representative, and a customer. This may effectively be referred to as a question/answer/question triplet regardless of whether the question/answer/question triplet includes a declarative statement, a testimonial, and/or an announcement, among other things, without necessarily including a question.

The question following each answer (i.e., $Q_2$) may be used by the success model to gauge the customer's satisfaction to the previous answer provided by the customer representative (e.g., to make a determination as to whether the customer representative's response was helpful). Furthermore, according to at least one embodiment of the present invention, all customer questions may be used to gauge a customer's satisfaction with a customer representative's answer. For example, a multi-dimensional success vector (as will be described in more detail with respect to step 208 below) may be generated for every answer provided by a customer representative, and all multi-dimensional success vectors may be aggregated to determine a customer's overall satisfaction with a customer representative. Upon aggregation of the multi-dimensional success vectors, a diminishing weight value may be given to a success vector based on the corresponding question's distance from the current answer. Aggregating success vectors may permit the trained machine learning model (i.e., the success model) to allocate additional weight to answers that subtly influenced the customer and customer representative conversation in a positive manner, even if later in the conversation.

For example, future customer questions may be reflective of how good the customer representative's original response was. Accordingly, at least one embodiment of the present invention may weigh the importance of a customer question based on the customer question's distance to the customer representative's original response. The success model may use the determined importance of the customer question when rating the success of the customer representative's response.

At 206, the separated triplets are tagged with intents, entities, and sentiments in order to determine the satisfaction of a customer. Each triplet may have more than one intent (e.g., primary and secondary intents), more than one entity (e.g., primary and secondary entities), and/or more than one sentiment (e.g., primary and secondary sentiments) which may be tagged by the response effectiveness program 110a, 110b. For example, a customer's statement may include two intents, with one relating to a request for information regarding a new product, and the second relating to an upgrade in the customer's service. In this case, the response effectiveness program 110a, 110b may tag the customer's statement with both intents, and depending on additional statements made by the customer during the customer's conversation with the customer representative, one tagged intent may be determined to be a primary intent (e.g., the intent primarily focused on by the customer) and one tagged intent may be determined to be a secondary intent (e.g., the customer's secondary focus).

The satisfaction of the customer may be measured using natural language classifiers which may be trained on classes such as happy or unhappy, among others, and/or by using analytical application programming interfaces (APIs).

Questions and answers in the received chat transcript, described previously with respect to step 202 above, may be automatically tagged using natural language classifiers to determine, based on follow up questions of the customer, whether the customer representative's responses were effective in assisting the customer.

IBM's Watson™ (Watson and all Watson-based trademarks are trademarks or registered trademarks of International Business Machines Corporation in the United States, and/or other countries) conversation analysis, sentiment analysis, and tone analyzer application programming interfaces (APIs) may be used to dynamically determine a satisfaction or frustration level of a customer. A sentiment analysis application programming interface (API) may determine whether a customer is temperamental, angry, disappointed, sad, or happy, among other things. A tone analyzer application programming interface (API) may measure dialog between the customer and the customer representative to determine whether the dialog is adversarial, frustrated, or friendly.

Natural language understanding (NLU) may also be utilized to tag key concepts and categories.

As related to chatbots, an intent may be a customer's intention or desired outcome, and an entity may modify an intent. For example, Watson™ Natural Language Classifier (NLC) may be used to classify the intent of a question, Watson™ Natural Language Understanding (NLU) may be used to tag the entities of a question, and Watson™ Conversation Analysis API may be used to tag the intent and entities of an utterance.

At 208, one or more multi-dimensional success vectors are generated. Using natural language classification, and based on the metrics described previously with respect to step 206 above, a multi-dimensional success vector may be calculated to represent the likelihood that a customer representative's response contributed toward one or more dimensions. The multi-dimensional success vector may be based on the customer's questions (e.g., $Q_2 \ldots Q_n$) to determine the likelihood that the customer representative's answer contributed to the following customer intents (i.e., dimensions of the success vector, business priorities): customer satisfaction (e.g., whether the customer was satisfied with the customer representative's response), trial (e.g., whether the customer agreed to the trial of a new product based on effective communication of the customer representative), base purchase (e.g., whether the customer representative assisted the customer in purchasing the product which the customer intended on purchasing), upgraded purchase (e.g., whether the customer agreed to purchase an upgraded product based on effective communication of the customer representative), purchase of an add-on (e.g., whether the customer agreed to purchase an additional product based on effective communication of the customer representative), purchase of one or more additional products (e.g., whether the customer agreed to purchase one or more additional products based on effective communication of the customer representative), alternate product purchase (e.g., whether the customer agreed to purchase a different product than the customer intended on purchasing), pricing, and/or future consultation. Customer intents may further include, but are not limited to including, the following: trial extensions, cancelation of a customer order, customer downgrades, creation of a customer account, purchase of a premium edition product, a customer's request for a business value statement, a customer's request for a discount, a customer's request for detailed pricing, a customer's request for use cases and/or reviews, a customer's purchase of an additional license, a customer's request for download instructions, a customer's request for purchase method options, a customer's request for a purchase order, a customer's request for volume and/or enterprise pricing, a customer's request which requires the opening of a ticket, and/or a customer's greeting (e.g., an opening statement such as hello or a closing statement such as goodbye).

The one or more multi-dimensional success vectors may depict whether a customer representative is successful on each of the vector's dimensions by assigning a numerical value between 0 and 1, where 0 represents an unsuccessful outcome and where 1 represents a successful outcome (e.g., a customer representative may have a 0 for alternate product purchase in instances where the customer does not purchase an alternate product, and likewise may have a 1 for alternate product purchase in instances where the customer purchases an alternate product). The customer representative may be assigned a numerical value between 0 and 1 in instances where a 0 or 1 may not be appropriate, but a determination as to satisfaction of the customer may be determined using natural language classification and based on the metrics described previously with respect to step 206 above.

Each dimension of the multi-dimensional success vector (i.e., customer intents, business priorities) may be given a different weighting. Weights may be determined based on current business priorities of a user of the response effectiveness program 110a, 110b, including those listed above. For example, a user may highlight within the response effectiveness program 110a, 110b that primary business priorities are signing users up for trials, encouraging users to bundle one or more items, and encouraging product upgrades. A weight of 1 may indicate the highest business priority while a weight of 0 may indicate the lowest business priority and/or an undesirable outcome.

The one or more multi-dimensional success vectors may be utilized in conjunction with one or more other machine learning models, as will be described in more detail with respect to FIGS. 3 and 4 below, to suggest helpful responses to customer representatives, and to match a customer to a customer representative based on historical chat transcript data. The one or more other machine learning models may be classification models such as Logistic Regression or Support Vector Machine (SVM), among others, which may evaluate each dimension (i.e., customer intent, business priority) associated with the customer's question.

According to at least one embodiment of the present invention, the results of the machine learning models may be combined using a linear model.

The multi-dimensional approach utilized by the response effectiveness program 110a, 110b may be effective in determining whether a customer representative's responses, which have less success in one-dimension (e.g., customer satisfaction), have been successful in another dimension (e.g., alternate product purchase). For example, a sentiment analysis API, described previously with respect to step 206 above, may determine that a customer is not happy to learn that a certain product costs as much as it does, but might still be amenable to purchasing an alternate product if the alternate product were suggested by the customer representative. The multi-dimensional approach may convey this information in the generated success vector.

At 210, the generated one or more multi-dimensional success vectors are aggregated. The weights of multi-dimensional success vectors may diminish based on the distance of the corresponding customer question to the customer representative's answer. For example, a multi-dimensional success vector corresponding to a question that was asked at a farther (in time) position may be given a lower weight than a question that was asked more recently. The timing of a customer question may be determined based on metadata which may include a timestamp of a customer's question.

At 212, the generated multi-dimensional success vector is used to improve the success model. As will be described in more detail below with respect to FIGS. 3 and 4, the generated multi-dimensional success vectors may be leveraged by the customer representative ratings process 300 and the customer to customer representative matching process 400 used by the response effectiveness program 110a and 110b.

As described previously with respect to step 208 above, data is automatically tagged using natural language classifiers to determine how a customer responds to a customer representative's answer. The tagged data may be utilized in conjunction with one or more other machine learning models to suggest helpful responses to future customer representatives.

By determining the most helpful responses provided by customer representatives, the response effectiveness program 110a, 110b may suggest the same or similar responses to future customer representatives who may be faced with the same and/or a similar customer question. A suggested response provided by the response effectiveness program 110a, 110b may be populated on the computer screen of a customer representative and/or may be populated on the computer screen of a customer and may include an interactive button which the customer may press to indicate that the suggested response is not helpful and/or accurate. An interactive button which enables the customer to indicate whether the suggested response is accurate may assist the response effectiveness program 110a, 110b in further training the machine learning model so that effective responses may be suggested to customers and/or customer representatives in the future.

For example, if the customer indicates, using an interactive button, that the customer representative's response is not accurate, then the associated multi-dimensional success vector may be modified to ensure that it does not depict a different result, which may inaccurately alter the machine learning model (i.e., the success model).

As described previously, the generated multi-dimensional success vectors for each response may be used to highlight the success of a customer representative based on a given customer question. For example, the generated multi-dimensional success vectors may be applied to a tool designed to suggest answers to customer representatives while the customer representative engages in conversation with a customer. This may permit the filtering out of poorly performing responses and/or may enable an overall rank of customer representative responses. The generated multi-dimensional success vectors may also be directly applied to a chatbot, and the highest rated customer representative responses may be used as the response to a customer question, based on the determined customer intent. Additionally, the generated multi-dimensional success vectors may be aggregated to evaluate a customer representative's ability to respond to a series of questions and/or to train a second machine learning model to classify which customer representative may be best at responding to a particular customer question.

Figure 3:
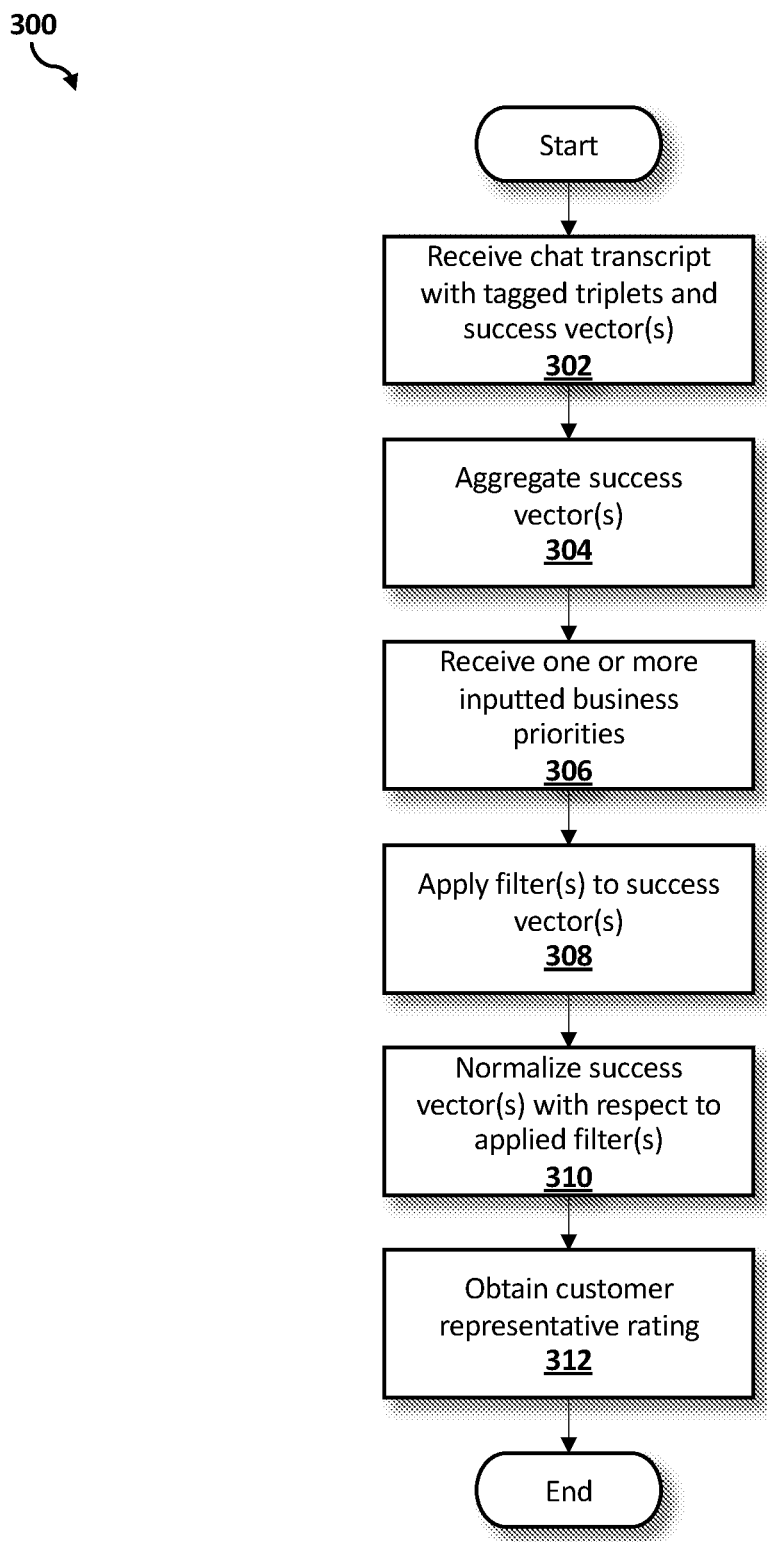
FIG. 3 is an operational flowchart illustrating a process for customer representative ratings according to at least one embodiment.

Referring now to FIG. 3, an operational flowchart illustrating the exemplary customer representative ratings process 300 used by the response effectiveness program 110a and 110b according to at least one embodiment is depicted.

At 302, historic chat transcript data with separated triplets and associated multi-dimensional success vectors is received and leveraged. The generated one or more multi-dimensional success vector, described previously with respect to step 208 above, may be leveraged to rate the response of a customer representative. A rating of a customer representative may be based on one or more orthogonal categories (i.e., business priorities, customer intents), as described previously with respect to step 208 above. For example, a customer's question may be tagged based on orthogonal categories such as intent of a customer (e.g., tagging a pretrained classifier with intents such as pricing, buy, trial, infrastructure, and/or analytics), entities (e.g., product XYZ, version V, etc.) and/or customer profile categories (e.g., decision maker, manager, developer, data scientist, etc.).

At 304, generated multi-dimensional success vectors are aggregated across each customer representative. Data may be aggregated by combining data collected regarding each individual customer representative into a customer representative database (e.g., database 114), which may house the collected unstructured data in a structured format. Customer questions may be tagged, as will be described in more detail below with respect to step 306, and may be aggregated across each customer representative to determine a rating for a single customer representative.

A customer representative may have a personal identification number, included in the chat metadata, which may enable the response effectiveness program 110a, 110b to accurately aggregate the results of a single customer representative. The personal identification number of a customer representative may further constitute a category by which aggregated customer representative data may be filtered. For example, the response effectiveness program 110a, 110b may filter aggregated data by looking at the results of a single customer representative.

At 306, a user of the response effectiveness program 110a, 110b defines business priorities (i.e., orthogonal categories, customer intents). A user may define one or more business priorities using an interface of the response effectiveness program 110a, 110b. The interface may enable the user to choose one or more business priorities from a drop-down menu and/or to manually input one or more business priorities into the interface. The user may optionally rate the order of importance of each business priority in order to assign a different weighting to each defined business priority.

Customer representative responses may be tagged and rated based on the defined business priorities. One or more defined business priorities may be defined by a user of the response effectiveness program 110a, 110b, and all defined business priorities may contribute to a customer representative's rating.

Since data may already be aggregated across each customer representative, the response effectiveness program 110a, 110b may later generate a single customer representative rating (i.e., a customer representative score) based on one or more defined business priorities.

For example, if a user of the response effectiveness program 110a, 110b defines as a primary business priority the sale of alternate products, then customer representatives may be rated based on, or in order of, performance of this business priority. Likewise, for any business priority defined by a user of the response effectiveness program 110a, 110b, customer representatives may be rated based on the customer representative's performance of the defined business priority.

At 308, a user may filter results based on defined business priorities. A filter may also be applied to filter and view the results of a single customer representative. As described previously with respect to step 306 above, a user of the response effectiveness program 110a, 110b may define one or more business priorities which may be important to the user and/or the user's business. Once business priorities are defined, a user may filter customer representative results (i.e., successes) based on business priorities and metadata. For example, a filter may be a customer representative's ability to sign a customer up for trials, persuade customers to upgrade accounts, arrange future consultation meetings, convince unhappy customers not to downgrade and/or cancel, and/or speak to certain audiences such as data scientists, among other things. The filters may be aggregated across agent groups and/or isolated with respect to a single agent.

At 310, the generated multi-dimensional success vectors may be normalized with respect to defined business priorities. To normalize the generated multi-dimensional success vectors, the multi-dimensional success vectors may be multiplied by a factor which makes the norm or some associated quantity (e.g., an integral) equal to a desired value. Normalization may make the norm a value of 1 and all other multi-dimensional success vectors may be given a relative value.

Normalizing generated multi-dimensional success vectors across intents, entities, and semantic clusters may enable the response effectiveness program 110a, 110b to identify the best customer representative answers to a wide variety of customer questions. Semantic clusters may be identified using unsupervised methods such as TF-IDF with K-Means clustering, among other things.

At 312, a customer representative's rating may be generated. The customer representative rating may be an overall value from 0 to 1, with 0 being the lowest rated customer representative and 1 being the highest rated customer representative. The customer representative rating may be across all of the above dimensions (e.g., those described with respect to step 208 above) or may only be across the dimensions indicated as a business priority by a user of the response effectiveness program 110a, 110b.

For example, as described previously with respect to step 208 above, the customer representative rating may consider which customer representative is the best at answering pricing questions for product XYZ; which customer representative is the most adept at getting users to sign up for trials; which customer representative has the most success dealing with data scientists; and/or which customer representative is the most effective, given the product that is being inquired about.

The customer representative rating may rate the customer representative's competency across a wide variety of categories. This may assist with overall evaluation scoring of a customer representative, evaluation of improvement needs of a customer representative, and/or matching of a customer to a customer representative.

A customer representative rating may be an aggregated multi-dimensional success vector wherein the weights for each dimension of the vector represent the one or more business priorities. For example, a weight of 1 may represent the highest business priority and a weight of 0 may represent the lowest business priority or an undesirable outcome. Furthermore, the aggregated success vector may have a time weighting on each response to ensure that the customer representative is rated on the most recent chat history.

Customer representative ratings may be stored in a customer rating database (e.g., database 114), may be stored in a spreadsheet, and/or may be plotted on a graph.

The customer representative ratings process 300 used by the response effectiveness program 110a and 110b may rate customer representatives and may assist in the building of a skills profile for each customer representative across a variety of orthogonal categories. A skills profile for each customer representative may be based on ratings provided for each for each customer representative's response, based on historical chat transcript data.

A customer representative rating may be generated by retrieving all answers that a customer representative provided, all customer responses (e.g., follow-up questions to a customer representative's answer), and all generated multi-dimensional success vectors for a given customer representative, as described previously with respect to step 208 above.

According to at least one embodiment of the present invention, once all customer representatives' answers have been rated, a machine learning model (i.e., a rating model) may be built which is trained to automatically rate a customer representative's answer based on the ratings generated by the customer representative ratings process 300 and the generated multi-dimensional success vectors, as described previously with respect to step 208 above. The rating model may be trained with various data points, including but not limited to a question posed by a customer, a customer representative's identification number, and a generated success vector. The question posed by the customer and the customer representative's identification number may be included within a database of historical chat transcript data, and the generated multi-dimensional success vector, described previously with respect to step 208 above, may be generated based on a customer's question following a customer representative's answer.

The rating model may be dynamic given the fact that the success of an answer may be a success vector based on many possible success outcomes (e.g., the dimensions described previously with respect to step 208 above).

The rating model may include a rating for each customer representative, which may be based on all answers the customer representative gave and the corresponding success of the customer representative's answers (e.g., as determined by on the response effectiveness process 200, described previously with respect to steps 202 through 210 above).

Figure 4:
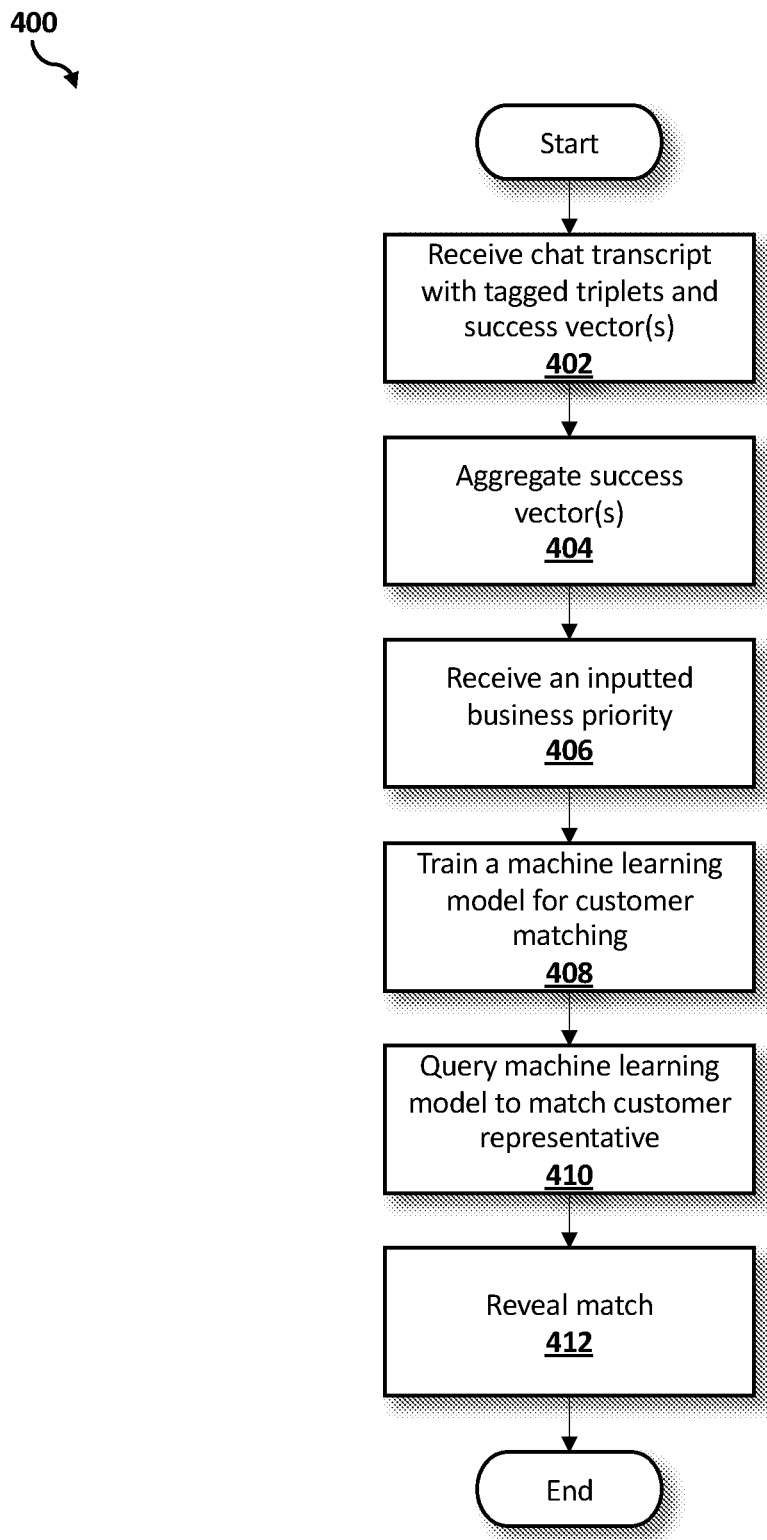
FIG. 4 is an operational flowchart illustrating a process for customer to customer representative matching according to at least one embodiment.

Referring now to FIG. 4, an operational flowchart illustrating the exemplary customer to customer representative matching process 400 used by the response effectiveness program 110*a* and 110*b* according to at least one embodiment is depicted.

At 402, historic chat transcript data with separated triplets and associated success vectors is received and leveraged. The generated multi-dimensional success vector, described previously with respect to step 208 above, may be leveraged to match a customer to a customer representative. The matching of a customer to a customer representative may be based on one or more orthogonal categories (i.e., business priorities, customer intents), as described previously with respect to step 208 above. For example, a customer may be matched to a customer representative based on a determination that the customer representative provided a satisfactory response to the same or a similar question in the past.

Historical chat transcript data, leveraged here, and described previously with respect to step 202 above, may include a series of customer representative responses which were deemed to be satisfactory in response to one or more customer questions, based on the response effectiveness process 200 used by the response effectiveness program 110*a* and 110*b*, described above.

At 404, generated multi-dimensional success vectors are aggregated across each customer representative. The functionality described previously with respect to step 304 above is incorporated herein. The success score of an older (in time) customer representative's answer may be penalized based on the answer's distance from the present time. For example, a weight may be applied to diminish the value of older answers in the overall matching algorithm based on the answer's distance from the present time. This may ensure that more recent answers are given more consideration, since a more recent answer may be influenced by the response effectiveness program 110*a*, 110*b* (e.g., a customer representative may learn to provide a more accurate answer based on feedback received through the program). Further, skills required by a customer representative, as well as a customer representative's abilities may change over time. The definition of a successful answer may also change over time. The assigned weight may serve to give greater consideration to customer representatives whose most recent answers have been deemed successful.

At 406, a user defines a business priority. An outcome of the customer to customer representative matching process 400 may be modified by changing the weight of each of the dimensions (i.e., customer intents, business priorities) of the success vector described previously with respect to step 208 above. For example, if, based on a customer's question and a determined customer intent, it is determined by the response effectiveness program 110*a*, 110*b* that the customer should be matched to a customer representative who has had great success in answering pricing questions, then the weight of the pricing dimension may be increased so that customer representatives with the highest rating in the pricing dimension may stand out and may be matched to the customer with a pricing question.

Likewise, as another example, if a business desires to increase trial registrations, then a user of the customer to customer representative matching process 400 of the response effectiveness program 110*a*, 110*b* may increase the weight of the trial dimension of the multi-dimensional success vector, described previously with respect to step 208 above, to prioritize customer representatives who were best at increasing trial registrations. As was described in the previous example, the response effectiveness program 110*a*, 110*b* may prioritize matching a customer to a customer representative who may have the highest probability of successfully answering the customer's question and/or furthering a business interest, based on an analysis of historical chat transcript data.

At 408, a machine learning model (i.e., a matching model) may be trained for customer to customer representative matching. A machine learning model (i.e., a matching model) may be trained with the generated multi-dimensional success vectors and customer representative identification numbers to determine the optimal customer representative based on a given customer question. Each dimension of the multi-dimensional success vector may be used by the matching model to learn a customer representative's success in a given dimension. The learned successes may be leveraged when matching the customer to a customer representative.

The machine learning model may be a neural network used to classify the appropriate customer representative based on the training data for a given utterance (i.e., a customer question and/or customer comment). Alternatively, TF-IDF clustering may be used on successful and unsuccessful responses in order to match a customer question to a similar customer question and to receive a set of customer representatives who may have performed successfully on the given customer question. In addition, the matching model may be trained to filter out past utterances which contain similar metadata to a current utterance (e.g., intent, entity, job role, etc.) and to look for a customer representative with the most successful utterances which are semantically similar to a new customer question.

The matching model may be a classification model such as Logistic Regression or Support Vector Machine (SVM), among others, which may evaluate each dimension (i.e., customer intent, business priority) associated with the customer's question.

At 410, the matching model is queried to match a customer representative and a customer. When a customer asks a question, the matching model may be queried with the question posed by the customer in order to determine which customer representative has the highest probability of successfully answering the customer's question.

The matching model may match a customer question to a set of customer questions that have been successfully answered.

If a customer representative with the highest rating is not available, or if the customer is already chatting with a different representative, then the customer satisfaction level, based on the multi-dimensional success vector described previously with respect to step 208 above, may be taken into consideration to determine which of the customer representatives' answers had the highest rating among customers for the same or a similar question. These highly rated answers may be provided to the customer representative assisting the customer so that the customer representative may provide highly rated assistance to the customer.

The matching model may suggest an answer automatically before matching the customer to the customer representative, based on the answers that were deemed successful by other customers who asked the same or similar questions.

The matching model may alternatively match a customer to a customer representative who may be able to successfully answer the customer's question, based on the customer representative's ability to answer the same or similar questions in the past.

For example, a customer may ask, "What are the data privacy features of product XYZ?" Based on the customer's question, the matching model may determine which customer representative may be the most adept at answering a given question, based on historical chat transcript data and the one or more multi-dimensional success vectors. The matching model may analyze the customer representative's competence in the relevant area and may return a customer representative who may be in the best position to answer the customer's question, based on the customer representative's knowledge as shown through responses to previous customer questions.

Likewise, a customer may be routed to the customer representative that is determined to have knowledge about product XYZ, or knows about anything related to product XYZ, including pricing and/or any other tangential information, based on the customer representative's responses to previous questions and the one or more multi-dimensional success vectors.

As another example, while a customer is chatting with a customer representative, if another customer representative is identified that can handle the customer's question more effectively, then the chat may be transferred to the other customer representative. Alternatively, the matching model may add an additional customer representative into the customer's chat with an initial customer representative if it is determined that the additional customer representative may be useful in resolving the customer's question.

The matching model may ultimately generate either the best representative for the given question, or a suggested answer to the question, based on the analysis described previously with respect to steps 402 through 408 above.

At 412, a customer representative match is revealed by the response effectiveness program 110a, 110b. As described previously with respect to step 410 above, the matching model may generate either the best representative for the given question, or a suggested answer to the question, the results of which may be outputted to the customer either by providing the customer with a response to the customer's question or by connecting the customer with a customer representative who may be able to successfully answer the customer's question.

It may be appreciated that FIGS. 2 through 4 provide only an illustration of one embodiment and do not imply any limitations with regard to how different embodiments may be implemented. Many modifications to the depicted embodiment(s) may be made based on design and implementation requirements.

Figure 5:
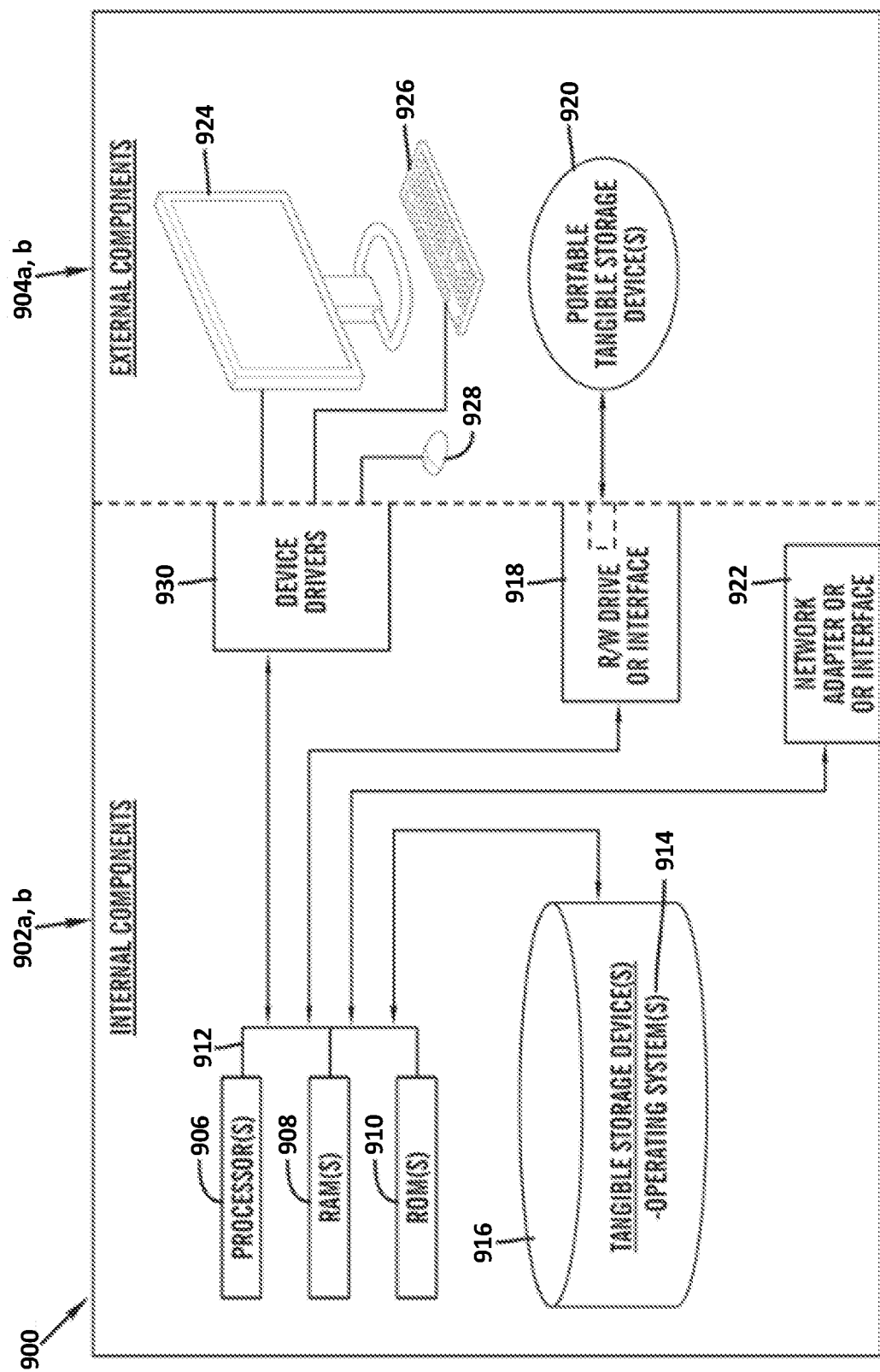
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 5. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the response effectiveness program 110a in client computer 102, and the response effectiveness program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the response effectiveness program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the response effectiveness program 110a in client computer 102 and the response effectiveness program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the response effectiveness program 110a in client computer 102 and the response effectiveness program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
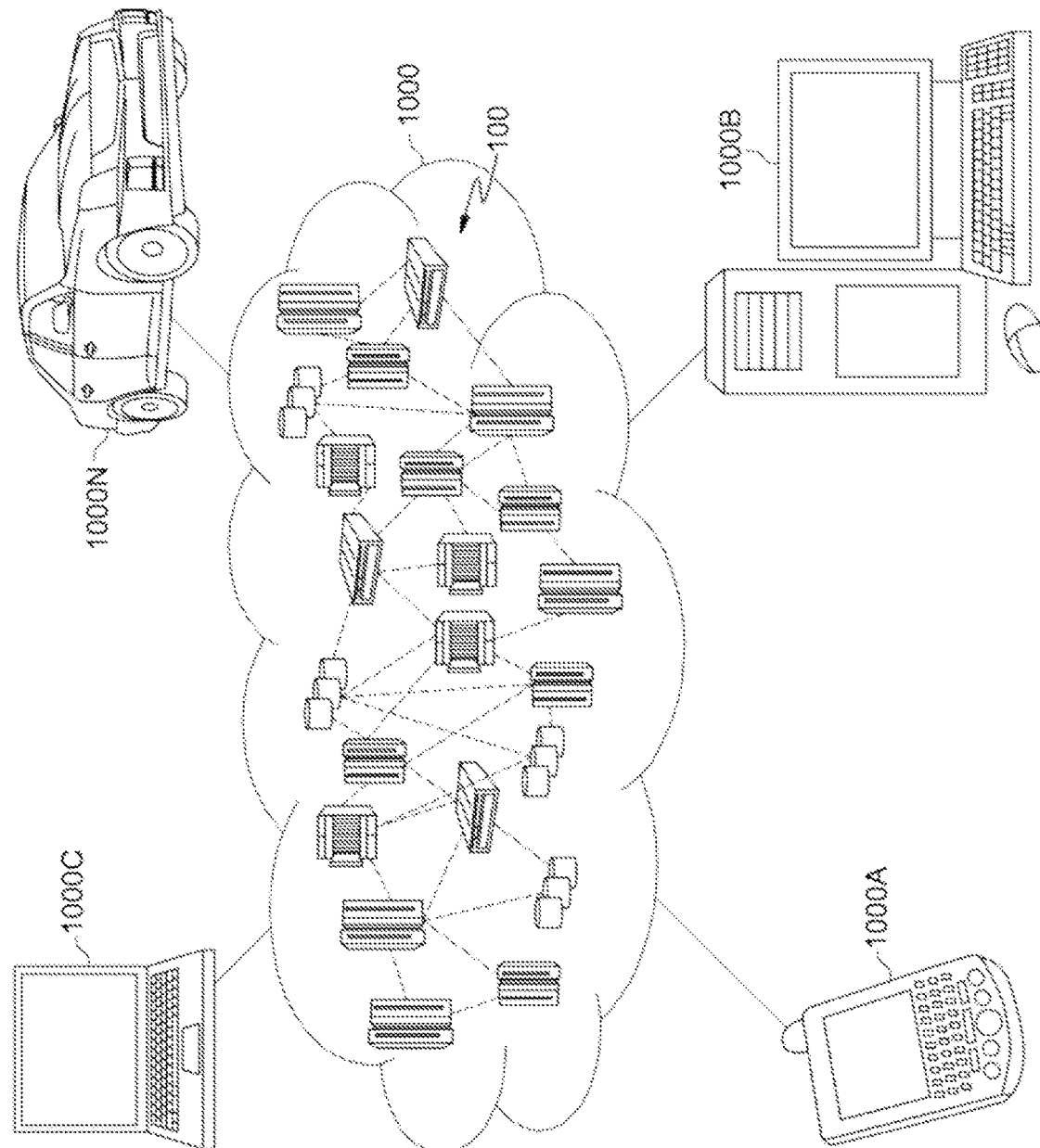
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
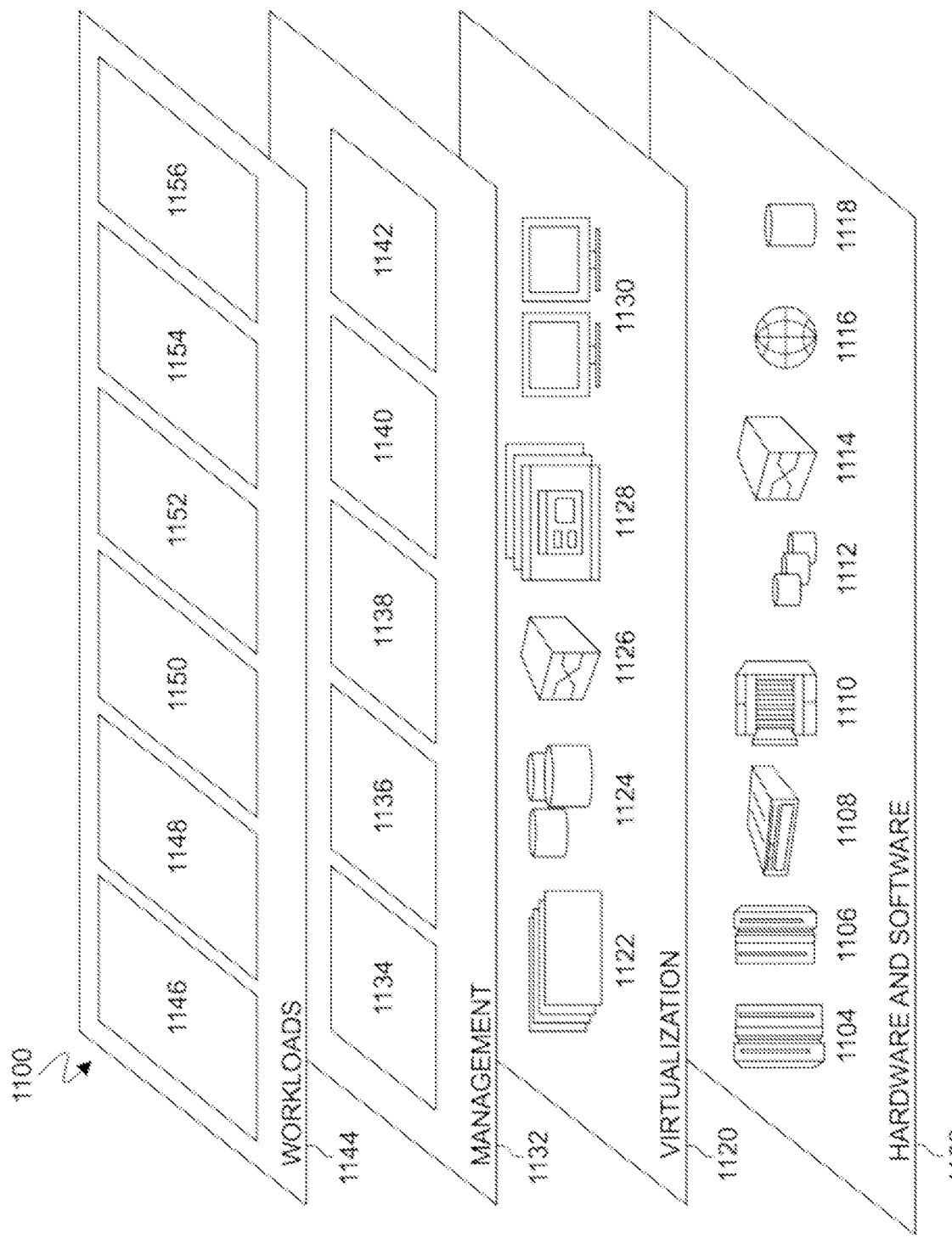
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and response effectiveness 1156. A response effectiveness program 110a, 110b provides a way to automatically rate, in multiple dimensions, how helpful customer representative responses were to individual customer questions, to provide an overall customer representative rating, and to dynamically match a customer to a customer representative based on the ratings determined by the response effectiveness program 110a, 110b.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for customer representative matching, the method comprising:
   separating a received chat transcript into a set of triplets, wherein a machine learning model utilizes a trained intent and entity classifier to tag each triplet in the set of triplets with one or more pre-defined tags;
   generating one or more multi-dimensional success vectors based on the one or more pre-defined tags;
   aggregating the one or more multi-dimensional success vectors;
   receiving at least one business priority;
   training a second machine learning model, which utilizes TF-IDF clustering, on a set of historical chat transcript data and metadata, and the aggregated one or more multi-dimensional success vectors;
   querying the trained second machine learning model to match the customer to at least one customer representative by filtering out at least one past utterance which contains similar metadata to a current utterance and by identifying a most successful utterance which is semantically similar to a new customer question; and
   revealing a match by outputting a response to the customer and connecting, via a chat interface, the customer and the at least one customer representative.

2. The method of claim 1, wherein aggregating the one or more multi-dimensional success vectors further comprises:
   assigning a weight to diminish a value of an older answer based on the older answer's distance from a present time and difference from a present success metric.

3. The method of claim 1, wherein receiving the at least one business priority further comprises:
   assigning a weight to each of the at least one business priorities, wherein a high business priority is given a high weight and a low business priority is given a low weight; and
   increasing the weight of the low business priority based on a user input.

4. The method of claim 1, wherein training the machine learning model to match the customer to the at least one customer representative further comprises:
   using the one or more multi-dimensional success vectors to learn the at least one customer representative's success in each dimension; and
   leveraging a learned success when matching the customer to the at least one customer representative.

5. The method of claim 1, wherein querying the trained machine learning model to match the customer to the at least one customer representative further comprises:
   querying the trained machine learning model with a customer question, wherein the customer question contains one or more dimensions of the multi-dimensional success vector;
   determining the at least one customer representative with the most success in the one or more dimensions; and providing the customer with a highly rated response of the at least one customer representative.

6. The method of claim 1, wherein querying the trained machine learning model to match the customer to the at least one customer representative further comprises:
   querying the trained machine learning model with a customer question, wherein the customer question contains one or more dimensions of the multi-dimensional success vector;
   determining the at least one customer representative with the most success in the one or more dimensions; and
   connecting the customer and the at least one customer representative.

7. A computer system for customer representative matching, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   separating a received chat transcript into a set of triplets, wherein a machine learning model utilizes a trained intent and entity classifier to tag each triplet in the set of triplets with one or more pre-defined tags;
   generating one or more multi-dimensional success vectors based on the one or more pre-defined tags;
   aggregating the one or more multi-dimensional success vectors;
   receiving at least one business priority;
   training a second machine learning model, which utilizes TF-IDF clustering, on a set of historical chat transcript data and metadata, and the aggregated one or more multi-dimensional success vectors;
   querying the trained second machine learning model to match the customer to at least one customer representative by filtering out at least one past utterance which contains similar metadata to a current utterance and by identifying a most successful utterance which is semantically similar to a new customer question; and
   revealing a match by outputting a response to the customer and connecting, via a chat interface, the customer and the at least one customer representative.

8. The computer system of claim 7, wherein aggregating the one or more multi-dimensional success vectors further comprises:
   assigning a weight to diminish a value of an older answer based on the older answer's distance from a present time and difference from a present success metric.

9. The computer system of claim 7, wherein receiving the at least one business priority further comprises:
   assigning a weight to each of the at least one business priorities, wherein a high business priority is given a high weight and a low business priority is given a low weight; and
   increasing the weight of the low business priority based on a user input.

10. The computer system of claim 7, wherein training the machine learning model to match the customer to the at least one customer representative further comprises:
   using the one or more multi-dimensional success vectors to learn the at least one customer representative's success in each dimension; and
   leveraging a learned success when matching the customer to the at least one customer representative.

11. The computer system of claim 7, wherein querying the trained machine learning model to match the customer to the at least one customer representative further comprises:
   querying the trained machine learning model with a customer question, wherein the customer question contains one or more dimensions of the multi-dimensional success vector;
   determining the at least one customer representative with the most success in the one or more dimensions; and
   providing the customer with a highly rated response of the at least one customer representative.

12. The computer system of claim 7, wherein querying the trained machine learning model to match the customer to the at least one customer representative further comprises:
   querying the trained machine learning model with a customer question, wherein the customer question contains one or more dimensions of the multi-dimensional success vector;
   determining the at least one customer representative with the most success in the one or more dimensions; and
   connecting the customer and the at least one customer representative.

13. A computer program product for customer representative matching, comprising:
   one or more non-transitory computer-readable storage media and program instructions stored on at least one of the one or more tangible storage media, the program instructions executable by a processor to cause the processor to perform a method comprising:
   separating a received chat transcript into a set of triplets, wherein a machine learning model utilizes a trained intent and entity classifier to tag each triplet in the set of triplets with one or more pre-defined tags;
   generating one or more multi-dimensional success vectors based on the one or more pre-defined tags;
   aggregating the one or more multi-dimensional success vectors;
   receiving at least one business priority;
   training a second machine learning model, which utilizes TF-IDF clustering, on a set of historical chat transcript data and metadata, and the aggregated one or more multi-dimensional success vectors;
   querying the trained second machine learning model to match the customer to at least one customer representative by filtering out at least one past utterance which contains similar metadata to a current utterance and by identifying a most successful utterance which is semantically similar to a new customer question; and
   revealing a match by outputting a response to the customer and connecting, via a chat interface, the customer and the at least one customer representative.

14. The computer program product of claim 13, wherein aggregating the one or more multi-dimensional success vectors further comprises:
   assigning a weight to diminish a value of an older answer based on the older answer's distance from a present time and difference from a present success metric.

15. The computer program product of claim 13, wherein receiving the at least one business priority further comprises:
   assigning a weight to each of the at least one business priorities, wherein a high business priority is given a high weight and a low business priority is given a low weight; and
   increasing the weight of the low business priority based on a user input.

16. The computer program product of claim 13, wherein training the machine learning model to match the customer to the at least one customer representative further comprises:
- using the one or more multi-dimensional success vectors to learn the at least one customer representative's success in each dimension; and
- leveraging a learned success when matching the customer to the at least one customer representative.

17. The computer program product of claim 13, wherein querying the trained machine learning model to match the customer to the at least one customer representative further comprises:
- querying the trained machine learning model with a customer question, wherein the customer question contains one or more dimensions of the multi-dimensional success vector;
- determining the at least one customer representative with the most success in the one or more dimensions; and
- providing the customer with a highly rated response of the at least one customer representative.

18. The computer program product of claim 13, wherein querying the trained machine learning model to match the customer to the at least one customer representative further comprises:
- querying the trained machine learning model with a customer question, wherein the customer question contains one or more dimensions of the multi-dimensional success vector;
- determining the at least one customer representative with the most success in the one or more dimensions; and
- connecting the customer and the at least one customer representative.

* * * * *